Oct. 9, 1934. J. A. VERTSON Re. 19,339

WELL REAMER

Original Filed Oct. 17, 1929 2 Sheets-Sheet 1

INVENTOR
J. A. VERTSON
BY Hazard and Miller
ATTORNEYS

WELL REAMER

Original Filed Oct. 17, 1929 2 Sheets-Sheet 2

INVENTOR
J. A. VERTSON
BY Hazard and Miller
ATTORNEYS

Reissued Oct. 9, 1934

Re. 19,339

UNITED STATES PATENT OFFICE 19,339

WELL REAMER

John A. Vertson, Brea, Calif., assignor to Security Investment Company of Whittier, Whittier, Calif., a corporation of California Original No. 1,809,258, dated June 9, 1931, Serial No. 400,316, October 17, 1929. Application for reissue May 6, 1933, Serial No. 669,782

28 Claims. (Cl. 255—73)

This invention relates to well reamers and to constructions of a similar nature.

An object of the invention is to provide an improved well reamer having toothed or grooved rotatable cutters so arranged that when the reamer is rotated in a well hole, the teeth will encounter the formation and produce a grinding or shearing action thereon.

Another object of the invention is to provide an improved well reamer having rotary cutters which are rotatable about axes which are inclined to the vertical. In such a construction I preferably employ cutters which are in the form of paraboloidal frustums so that each cutter will bear upon the walls of the well hole throughout its entire length.

A further object of the invention is to provide a well reamer which will effectively ream the walls of a well hole with a minimum amount of driving effort and which is of cheap, simple and durable construction.

With the foregoing and other objects in view, which will be made manifest in the following detailed description, and specifically pointed out in the appended claims, reference is had to the accompanying drawings for an illustrative embodiment of the invention, wherein:

Figure 1:
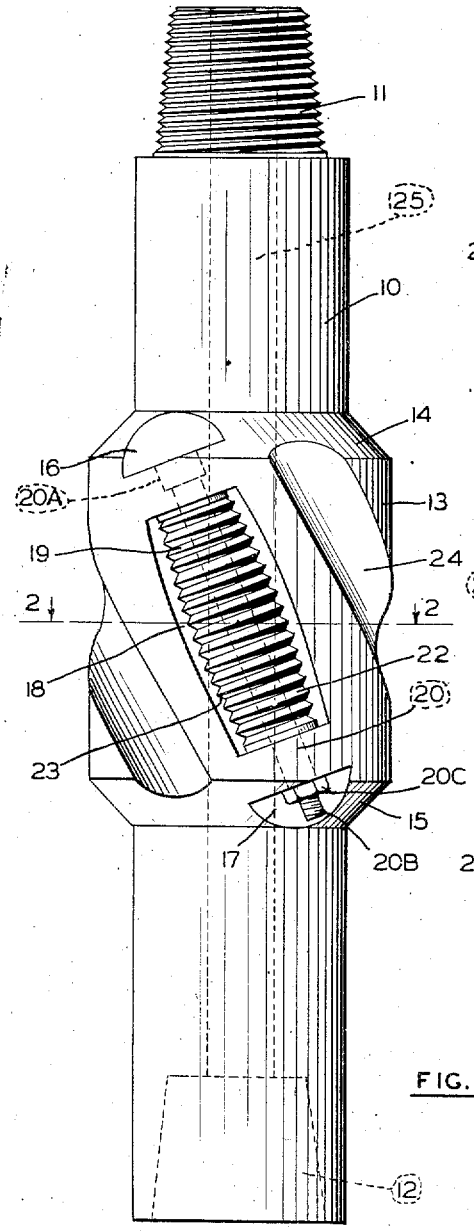
Fig. 1 is a view in side elevation of the improved well reamer.

Referring to the accompanying drawings, wherein similar reference characters designate similar parts throughout, the improved well reamer comprises a cylindrical body 10, having on one end a tool joint pin 11 and on the opposite end a tool joint box indicated at 12. Any other suitable construction may be substituted for the pin and box to attach the reamer and incorporate it in a drill pipe.

Figure 7:
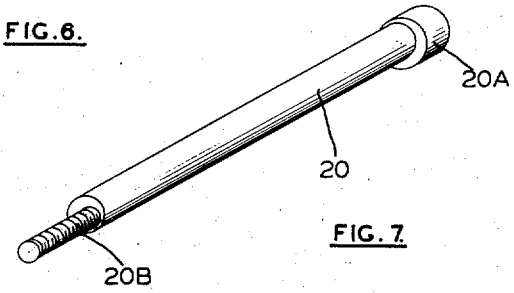
Fig. 7 is a perspective view of one of the pins employed in the improved reamer.

The central portion of the body 10 is enlarged, as indicated at 13, having at its top and bottom inclined shoulders 14 and 15. In these shoulders recesses 16 and 17 are formed having flat bottoms. These recesses are arranged otherwise than in vertical alignment. Elongated recesses 18 are formed in the enlargement 13 between each pair of recesses 16 and 17. The recesses 18 are approximately semi-cylindrical in form and are adapted to receive rotatable cutters 19, which are rotatable on pins 20 extending through bores 21 in the body from recesses 16 to recesses 17. As clearly shown in Fig. 7, the upper ends of the pins 20 have heads 20*a* offset, which are recessed in the countersunk upper ends of the bores 21. In a like manner the lower ends of the pins 20 have offset threaded stems 20*b* adapted to receive nuts 20*c*. By the offset arrangement, the heads 20*a* and the nuts 20*c* will be disposed inwardly from the peripheral surface of the body so that they cannot be engaged or damaged by the walls of the hole. It will be noted that the pins 20, which provide the bearings for the cutters, are inclined to the vertical and to the horizontal. Their upper ends are inclined in the direction of rotation.

Figure 2:
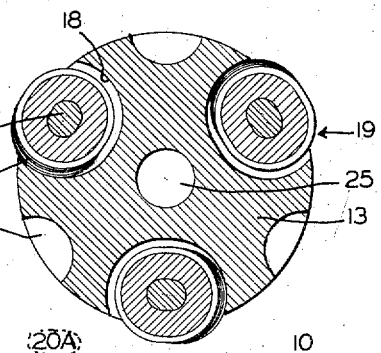
Fig. 2 is a horizontal section taken substantially upon the line 2—2 upon Fig. 1.

In the modification shown in Figs. 1 and 2 each cutter is in the form of a paraboloidal frustum or may be simply described as being somewhat barrel shaped in form. On its exterior surface it is provided with a plurality of annular grooves, indicated at 22, which define teeth 23, somewhat similar to ordinary threads with the exception that each tooth or thread does not progress from one end of the cutter to the other. Between the recesses 18 suitable grooves 24 are formed extending from the top to the bottom of the enlargement 13. These grooves may in some instances be omitted but when employed serve to facilitate the upward flow of circulation fluid about the reamer, which is discharged through the drill pipe and through the axial bore 25 formed in the body 10.

When the reamer is in the well and is rotated toward the right, the teeth 23 on the rotary cutters encounter the walls of the well at an angle and, although the cutters may roll or rotate on the pins 20, the arrangement is such that the teeth produce a grinding or shearing action on the formation effectively reaming the well to the desired size. While the number of rotary cutters on the reamer is illustrated as being three in number, as shown in Fig. 2, it will be readily understood that this number can be varied. Because of the fact that the cutters are rotatable about axes which are inclined to the vertical, as shown, each cutter is given the shape, substantially as shown, wherein the diameter of its center is somewhat greater than adjacent either end. By such a construction each cutter will bear against and ream the formation throughout its entire length, which would not be true if the cutters were cylindrical in shape, rotating on the inclined axes as shown.

Figure 3:
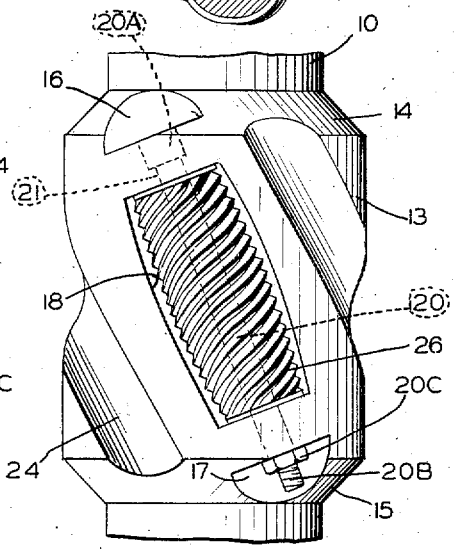
Fig. 3 is a partial view in side elevation illustrating a slightly modified form of construction.

The modification disclosed in Fig. 3 is substantially the same as that disclosed in Fig. 1 with the exception that the teeth 26 instead of being annular are in the form of either single or multiple threads, progressing from one end toward the other of the cutter. The advantages previously described in connection with the construction disclosed in Figs. 1 and 2 are present in this construction in a like manner. By having the teeth in the form of threads a greater inclination of the teeth relatively to the direction of movement with respect to the formation is possible.

Figure 4:
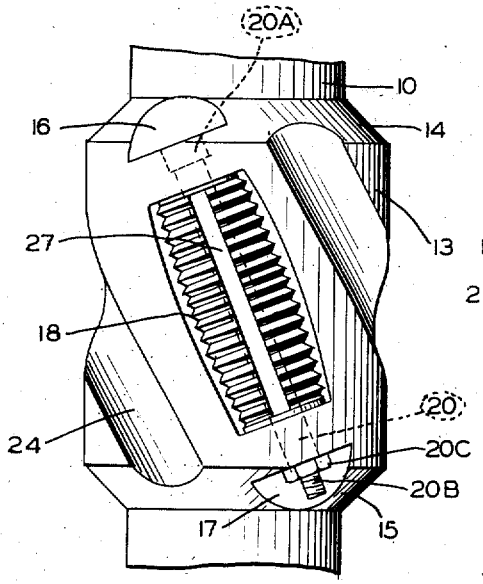
Fig. 4 illustrates a further modification, in side elevation.

In the modification disclosed in Fig. 4 each cutter is of substantially the same construction as that disclosed in Fig. 1, the only difference residing in the provision of a longitudinal groove 27, which is arranged at suitable intervals on the exterior surface of the cutter. This longitudinally extending groove traverses the teeth and facilitates the upward flow of circulation fluid through each cutter. The threads or teeth on each cutter are thus divided by the grooves and present sharp ends which penetrate and shear off the formation somewhat more easily under certain circumstances than a cutter having annular teeth, as shown in Fig. 1.

Figure 5:
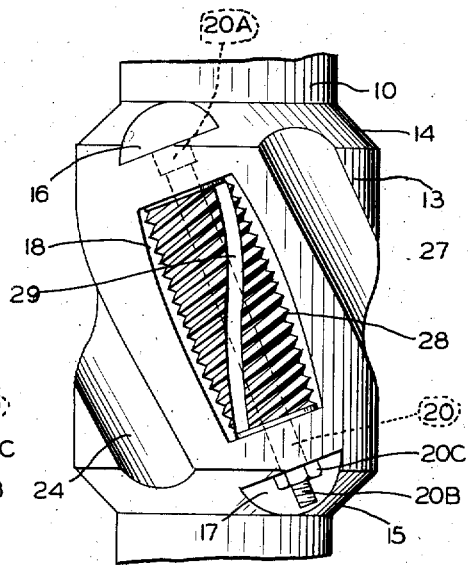
Fig. 5 is a partial view in side elevation, illustrating a further form embodying the invention.

Fig. 5 illustrates a construction wherein each cutter is similar to the cutters disclosed in Fig. 3, having helical teeth 28. These are traversed by a helically extending longitudinal groove 29, serving substantially the same purposes as the groove 27 disclosed in Fig. 4.

Figure 6:
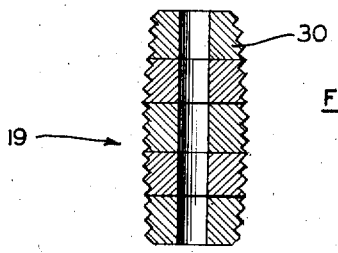
Fig. 6 is a sectional view through a modified cutter construction.

In Fig. 6 a further modified form of construction of cutter is disclosed wherein each cutter is made up of a plurality of independent segments 30. Each segment is provided with a few teeth and is so formed that when a plurality of segments are assembled together they cooperate to form a cutter of the barrel shape herebefore described.

It will be readily understood that any one of the cutter constructions may be employed on the improved reamer and that features present in one form of cutter may be incorporated in the construction of others. The improved reamer is highly advantageous in that the cutter does not merely roll against the formation, packing the formation into the walls of the well, but instead rolls on the formation and by virtue of its teeth shears portions of it away so that there is in reality a shearing or grinding action. This shearing or grinding action, causing the walls of the well to be reamed very smoothly, can be accomplished with a minimum amount of turning effort on the drill pipe.

The above described reamer may be briefly described as consisting of a body adapted to be rotated with rotary cutters mounted on the body in such a manner that during cutting or reaming operations the cutter will be held by the body the desired distance from its center. In other words, the body provides a rigid structure preventing the inward movement of the cutters when they are engaging the walls of a well. One end of each cutter is higher than the other, and the ends of each cutter are arranged in different radial planes, so that each cutter is inclined through a radial plane from the center of the body arranged between the ends of the cutter. It will be appreciated that the invention may be embodied in various types of reamers and is not restricted to a stationary reamer as shown, but may be applied to expansion reamers such as under-reamers.

The above described construction, while it is particularly adapted to be used in well reamers, can be advantageously employed in a swaging tool for swaging out collapsed casing. When the tool is constructed for swaging purposes, the exterior surfaces of the rollers or cutters are preferably left smooth so as not to puncture or weaken the casing.

Various changes may be made in the details of construction without departing from the spirit or scope of the invention as defined by the appended claims.

I claim:

1. A reamer comprising a body, and rotary cutters mounted thereon, said cutters being so mounted that during reaming operations they will be held by the body the desired distance from its center, each cutter having its ends arranged one higher than the other and in different radial planes of the body, the upper ends of the cutters being in advance of their lower ends toward the direction of rotation of the body, the general contour of each cutter being somewhat barrel-shaped in form designed to engage the walls of a hole throughout substantially the complete length of the cutter.

2. A reamer comprising a body, rotary cutters mounted thereon, said cutters being so mounted that during reaming operations they will be held by the body the desired distance from the center of the body, each cutter having its ends arranged upon different radial planes and being of general barrel-shaped form designed to engage the walls of a hole throughout substantially the entire length of the cutter.

3. A reamer comprising a body, rotary cutters mounted thereon, said cutters being so mounted that during reaming they will be maintained by the body the desired radial distance from its center with the ends of each cutter substantially equi-distant from the center of the body with one end higher than the other and the ends arranged on different radial planes, said cutters being barrel-shaped in form designed to engage the walls of a hole throughout substantially their entire lengths.

4. A reamer comprising a body, rotary cutters mounted for rotation upon the body about axes which are maintained by the body the desired distance from its center during cutting operations, each cutter being downwardly inclined through a plane between the ends of the cutter arranged radially of the body, each cutter presenting a longitudinally curved outer surface designed to be substantially complementary to the walls of a hole and having thereon circumferentially extending teeth.

5. A reamer comprising a body, and rotary cutters mounted thereon, said cutters being so mounted that during reaming operations they will be held by the body the desired distance from its center, each cutter having its ends arranged one higher than the other and in different radial planes of the body, the upper ends of the cutters being in advance of their lower ends toward the direction of the rotation of the body, said cutters being barrel-shaped in form and having circumferentially extending cutting edges designed to have each cutting edge engage the walls of a hole.

6. A reamer comprising a body rotatable about its vertical central axis, rotary cutters mounted thereon, each cutter having its ends arranged one higher than the other and in different radial planes from the vertical central axis of the body, the general contour of each cutter being somewhat barrel shaped in form so as to be capable of engaging the walls of a hole throughout substantially the complete length of the cutter, each cutter having circumferentially extending teeth thereon.

7. A reamer comprising a body rotatable about its vertical central axis, rotary cutters mounted thereon, each cutter having its ends arranged one higher than the other and in different radial planes from the vertical central axis of the body, the general contour of each cutter being somewhat barrel shaped in form so as to be capable of engaging the walls of a hole throughout substantially the complete length of the cutter, each cutter having circumferentially extending teeth thereon the outermost portions of which are inclined to the horizontal.

8. A reamer comprising a body rotatable about its vertical central axis, at least one rotary cutter mounted upon said body having its ends arranged one higher than the other and in different radial planes, said cutter having circumferentially extending teeth the outer edges of which are arranged on a smooth curve longitudinally of the cutter with the teeth intermediate the ends of the cutter projecting outwardly from the axis of the cutter a greater distance than the teeth at its ends so that each tooth may have its outermost portion engage the walls of a well.

9. A reamer comprising a body rotatable about its vertical central axis, at least one rotary cutter mounted upon said body having its ends arranged one higher than the other and in different radial planes, said cutter having helical teeth thereon the outer edges of which teeth intermediate the ends of the cutter project outwardly a greater distance from the axis of the cutter than those teeth adjacent the ends of the cutter.

10. A reamer comprising a body rotatable about its vertical central axis, at least one rotary cutter mounted upon said body having its ends arranged one higher than the other and in different radial planes, said cutter being made up of assembled annular segments, each segment presenting circumferentially extending teeth, with the teeth on the segments intermediate the ends of the cutter projecting outwardly a greater distance from the axis of the cutter than the teeth on the segments at the ends.

11. A reamer comprising a body rotatable about its vertical central axis, at least one rotary cutter mounted upon said body having its ends arranged one higher than the other and in different radial planes, said cutter being made up of assembled annular segments, each segment presenting circumferentially extending teeth, with the teeth on the segments progressively projecting a greater distance from the axis of the cutter from the ends of the cutter toward the center thereof.

12. A well reamer comprising a body rotatable about its vertical central axis, and means providing a helical row of cutting teeth upon the body, each tooth presenting an outer edge which is inclined to the horizontal so as to scarify the walls of the well during rotation of the body, all teeth having their outer edges equidistant from the vertical central axis so that with each tooth bearing against the walls of the well a circumferentially distributed engagement between the reamer and the walls of the well will be provided.

13. A well reamer comprising a body rotatable about its vertical central axis, and means providing a helical row of cutting teeth upon the body, each tooth presenting an outer edge which is at approximately right angles to the length of the row, all teeth having their outer edges equidistant from the vertical central axis so that each tooth will engage the walls of a well affording a helically distributed engagement between the reamer and the walls of the well.

14. A well reamer comprising a body rotatable about its vertical central axis, a cutter mounted upon the body having its upper end circumferentially displaced with respect to its lower end, said cutter having teeth, those teeth of the cutter which are adjacent its middle projecting farther from the body of the cutter than the teeth adjacent its ends so that the middle teeth on the cutter will engage the walls of a well as well as the top and bottom teeth.

15. A well reamer comprising a body rotatable about its vertical central axis, and means providing a series of cutting edges on the body, the outermost portions of the cutting edges being arranged on substantially a cylindrical helix and being inclined to both the vertical and the horizontal but more closely approaching the horizontal.

16. A well reamer comprising a body rotatable about its vertical central axis, and means providing a series of cutting edges on the body, the outermost portions of the cutting edges being arranged on substantially a helix, the outermost portions of the cutting edges extending at approximately right angles to the helix.

17. A well reamer comprising a body rotatable about its vertical central axis, and at least one cutter mounted upon the body, said cutter having at least three teeth arranged in an oblique row, the outermost portions of the edges of the teeth being inclined to both the vertical and horizontal, the end teeth projecting a shorter distance from the sides of the body than intermediate teeth so that the outermost portions of the intermediate teeth may engage the walls of the well as well as the end teeth.

18. A well reamer comprising a body rotatable about its vertical central axis, and at least one cutter mounted upon the body, said cutter having at least three teeth arranged in an oblique row, the outermost portions of the edges of the teeth being inclined to both the vertical and horizontal and arranged to each engage a surface of revolution about the body so that with each tooth engageable with the surface there will be a circumferentially distributed engagement between the reamer and the walls of the well.

19. A well reamer comprising a body rotatable about its vertical central axis, and at least one cutter mounted upon the body, said cutter having at least three teeth arranged in an oblique row, the outermost portions of the edges of the teeth being inclined to both the vertical and horizontal and arranged to each engage a substantially cylindrical well wall so that with each tooth engageable with the well wall there will be a circumferentially distributed engagement between the reamer and the walls of the well.

20. A well reamer comprising a body rotatable about its vertical central axis, and a cutter mounted upon the body having toothed outermost portions arranged in an oblique row, the intermediate teeth on the cutter projecting outwardly beyond an oblique straight line connecting top and bottom teeth but being all arranged to engage a surface of revolution about the body.

21. A well reamer comprising a body rotatable about its vertical central axis, and a cutter mounted upon the body presenting toothed outermost portions arranged in a straight oblique row, those teeth on the cutter which are between the ends of the cutter projecting outwardly beyond an oblique straight line connecting top and bottom teeth but being all arranged to engage a surface of revolution about the body.

22. A well reamer comprising a body rotatable about its vertical central axis, and a cutter mounted upon the body having toothed outermost portions arranged in an oblique row, the intermediate teeth on the cutter projecting outwardly beyond an oblique straight line connecting top and bottom teeth but being all arranged to engage a surface of revolution about the body, the outermost portions of the edges of the teeth being inclined to both the vertical and the horizontal.

23. A well reamer comprising a body rotatable about its vertical central axis, and a cutter mounted upon the body presenting toothed outermost portions arranged in a straight oblique row, those teeth on the cutter which are between the ends of the cutter projecting outwardly beyond an oblique straight line connecting top and bottom teeth but being all arranged to engage a surface of revolution about the body, the outermost portions of the edges of the teeth being arranged at approximately right angles to the length of the row.

24. A well reamer comprising a body rotatable about its vertical central axis, and a cutter mounted upon the body presenting toothed outermost portions arranged in a straight oblique row, those teeth on the cutter which are between the ends of the cutter projecting outwardly beyond an oblique straight line connecting top and bottom teeth but being all arranged to engage a surface of revolution about the body, the outermost portions of the edges of the teeth being arranged at approximately right angles to the length of the row and being inclined downwardly in the normal direction of rotation of the body.

25. A well reamer comprising a body rotatable about its vertical central axis and an outwardly bellied toothed cutter obliquely mounted in a tangential direction upon the body.

26. A well reamer comprising a body rotatable about its vertical central axis and an outwardly bellied toothed cutter obliquely mounted in a tangential direction upon the body, the teeth being inclined downwardly in the normal direction of rotation of the body.

27. A well reamer comprising a body rotatable about its vertical central axis, a plurality of teeth on the body arranged so as to be circumferentially distributed thereon one above the other in rows of more than two, said teeth presenting outer cutting edges, all of which are simultaneously engageable with the walls of a well, said cutting edges being inclined to the horizontal but approaching the horizontal so as to shear or slice the formation during rotation of the reamer.

28. A well reamer comprising a body rotatable about its vertical central axis, and means providing at least one helically arranged row of more than two teeth on the body, all of which are arranged to simultaneously engage the walls of a well, the outer edges of the teeth being inclined to but approaching the horizontal so as to scarify the walls of the well during rotation.

J. A. VERTSON.